United States Patent [11] 3,603,808

[72] Inventor Frederik Leonard Johan Sangster Emmasingel, Eindhoven, Netherlands
[21] Appl. No. 826,537
[22] Filed May 21, 1969
[45] Patented Sept. 7, 1971
[73] Assignee U.S. Philips Corporation New York, N.Y.
[32] Priority May 25, 1968
[33] Netherlands
[31] 6807435

[54] CAPACITOR STORE
3 Claims, 3 Drawing Figs.

[52] U.S. Cl. .......... 307/221, 307/255, 307/294, 307/313
[51] Int. Cl. .......... G11c 11/00
[50] Field of Search .......... 307/221, 255, 313, 293, 223, 294

[56] References Cited

UNITED STATES PATENTS

| | | | |
|---|---|---|---|
| 3,095,509 | 6/1963 | Hileman | 307/255 |
| 3,252,009 | 5/1966 | Weimer | 307/221 |
| 3,289,010 | 11/1966 | Bacon | 307/221 |
| 3,402,355 | 9/1968 | Hannan | 307/293 |
| 3,471,711 | 10/1969 | Poschenrieder | 307/221 |
| 3,474,260 | 10/1969 | Frohbach | 307/221 |

*Primary Examiner*—Donald D. Forrer
*Assistant Examiner*—David M. Carter
*Attorney*—Frank R. Trifari

ABSTRACT: A capacitor store wherein a plurality of serially connected transistors of alternating opposite polarity types are interconnected at the respective collector and emitter terminals thereof, at each of which connection points a capacitor is connected between the connection point and ground. Alternate transistors are connected to sources of oppositely polarized switching pulses. In the interval between switching pulses of like polarity a second pair of switching pulses of the same polarity as the corresponding first switching pulses are applied through diodes to the collectors of each transistor in the capacitor store.

Figure 1:
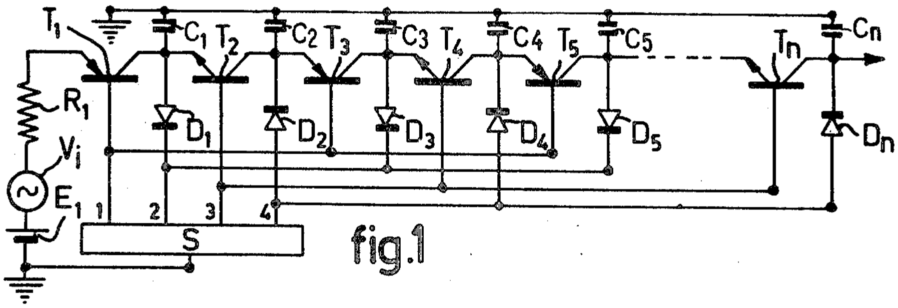

INVENTOR.
FREDERIK L.J. SANGSTER
BY
[signature]
AGENT

INVENTOR.
FREDERIKUS SANGSTER
BY
AGENT

CAPACITOR STORE

The invention relates to a capacitor store comprising a sequence of capacitors which are connected to one another by way of the main current paths of transistors, the control electrodes of the transistors being interconnected in groups so as to form junction points to which control signals are applied which are shifted in phase in the order of the numbers of the junction points. Capacitor stores are frequently used as delay lines, for example, for audiofrequency of video-frequency signals. For this purpose the charge stored in any of the capacitors of the sequence must be transferred to a succeeding capacitor of the sequence with as little loss as possible.

In a known capacitor store of this kind as described in U.S. Pat. 3,546,490, filed Oct. 17, 1967 successive capacitors of the sequence of capacitors are connected to one another each through the emitter collector path of an NPN-transistor. The capacitor terminals remote from the collector circuits are connected to the bases of the respective transistors. The bases of the transistors are interconnected in groups so as to form base junction points to which control signals are applied, these control signals being relatively shifted in phase in accordance with the order of the ordinal numbers of the base junction points. As has been described in the said patent application, a linear relationship between the voltage drop $\Delta V$ across the storage capacitor of the first stage of the store and the input signal applied to this first stage will only exist for input signals situated in the interval $-E \leq V_i \leq +E$, where E is the amplitude of the control signal. In the said interval the voltage drop $\Delta V$ across the said capacitor will pass through the interval $0 \leq V \leq +E$. When the input signal $V_i$ is equal to 0 volts, the voltage drop $\Delta V$ across the capacitor of the first stage will be equal to one-half E and this voltage drop will hereinafter be referred to as the zero level. When the input signal $V_i$ is equal to $-E$ volts, the voltage drop $\Delta V$ across the capacitor of the first stage will be equal to 0 volts, and this voltage drop will hereinafter be referred to as the peak level.

When the sequence of capacitors in this known capacitor store is large, operation of the store is impaired by the fact that charge will be lost during the transfer of charge between two successive capacitors of the sequence of capacitors, because the collector-emitter current gain factor $\alpha$ of the transistors used is slightly less than unity. As a result, the zero level rises slowly towards the peak level as the charge is shifted. This effect is increased by the fact that the transistor charging currents will also be decreased after each stage in the store and hence in most of the transistors the collector-emitter current gain factor $\alpha$ will also decrease. After a given number of stages, generally after a few tens of stages, the said zero level has risen to a height such that in the upper peaks of the signal the transistor leaves its linear operating range, so that the signal is flattened and hence distorted.

In Dutch patent application No. 6,615,058 copending with the first mentioned Dutch patent application No. 6,615,057 (now U.S. Pat. 3,546,490) the said charge losses are entirely or partly compensated for by shunting one or more of the capacitors of the sequence by the series combination of a diode which is conductive during the charge transfer and of an additional capacitor which constitutes the output impedance between the emitter and collector of the auxiliary transistor the base-emitter path of which is connected, with the opposite pass direction, in parallel with the said diode, the junction point of the diode and the base of the auxiliary transistor being connected to that terminal of the capacitor from which the charge for the succeeding capacitor is taken.

This solution of the problem of complete or partial compensation of the said charge losses is suitable for use in capacitor stores in which the sequence of capacitors is not too large. Since the emitter-collector current gain factor $\alpha$ of the employed transistors is different in each individual transistor, the gain of each of the charge amplifiers used must be adjustable, which may be achieved, for example, by using variable capacitors as the additional capacitors in the charge amplifiers. This solution is unsuitable for use in capacitor stores in which the number of the capacitors of the sequence is large, for example, 200. In this case about five charge amplifiers are required and this means that before such a capacitor store is put into operation these five charge amplifiers must be individually adjusted, which severely reduces the convenience of manipulation of the capacitor store. Furthermore, in view of the permissible distortion of the electric output signal of the capacitor store, the location at which the charge amplifier is included in the capacitor store determines the permissible amplitude of the electric input signal applied to the store. Measurements have shown that in a 50-capacitor store the permissible amplitude of the input signal at a point preceding the first charge amplifier is about one-half of the possible driving range $-E \leq V_i \leq +E$ of the first transistor of the store and that in a 200-capacitor store the permissible amplitude of the input signal is equal to zero.

The invention enables a circuit arrangement of the kind described to be built in which the permissible amplitude of the input signal in view of the possible distortion of the output signal is independent of the number of stages used in the capacitor store, the number of charge amplifiers required in the capacitor store is drastically reduced and furthermore the capacitor store is highly suitable for integration in a single semiconductor body.

The invention is characterized in that successive transistors are of opposite conductivity types and that the control signals are alternately of positive and negative polarity in the order of the numbers of the junction points.

Figure 2:
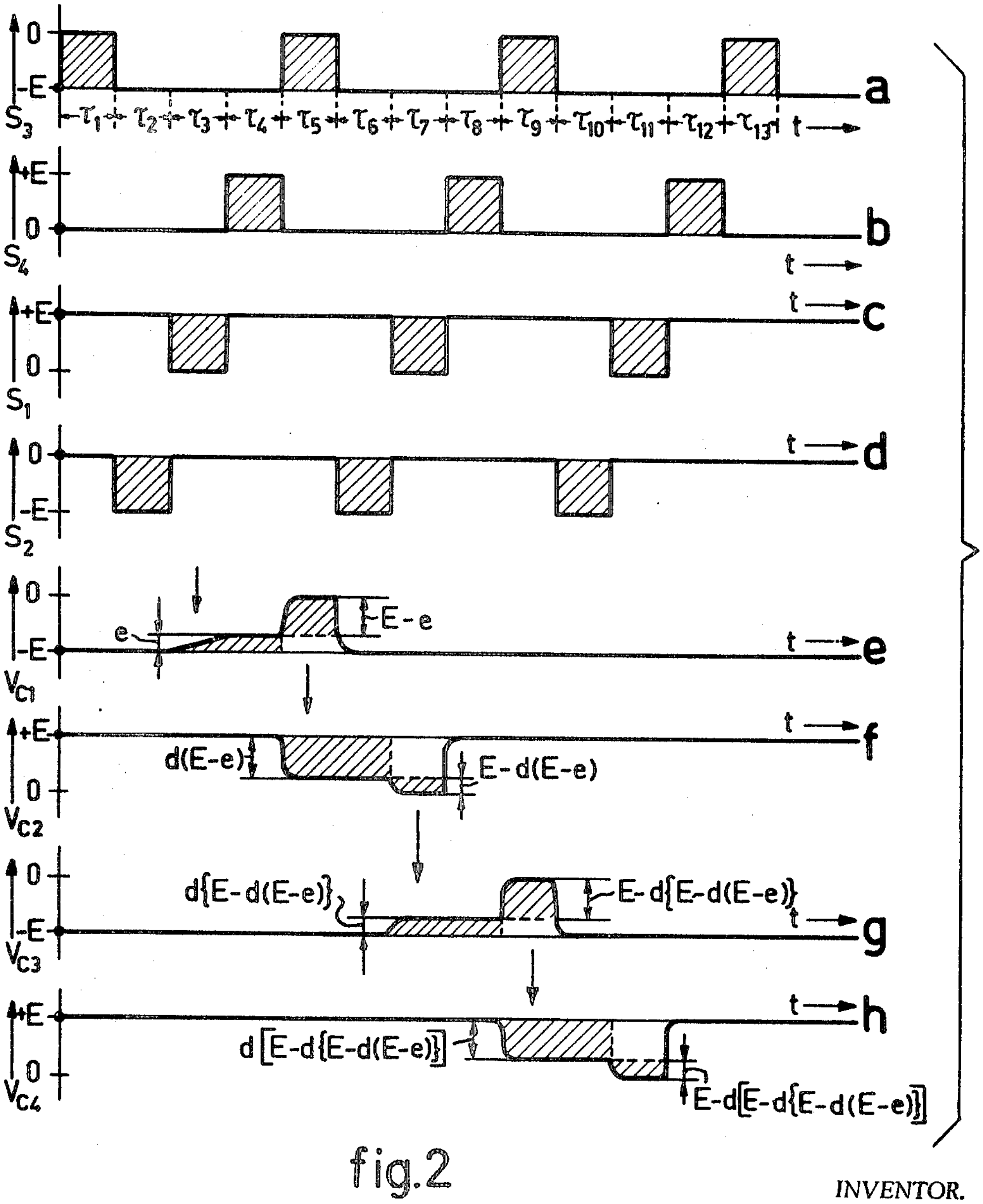
Figure 3:
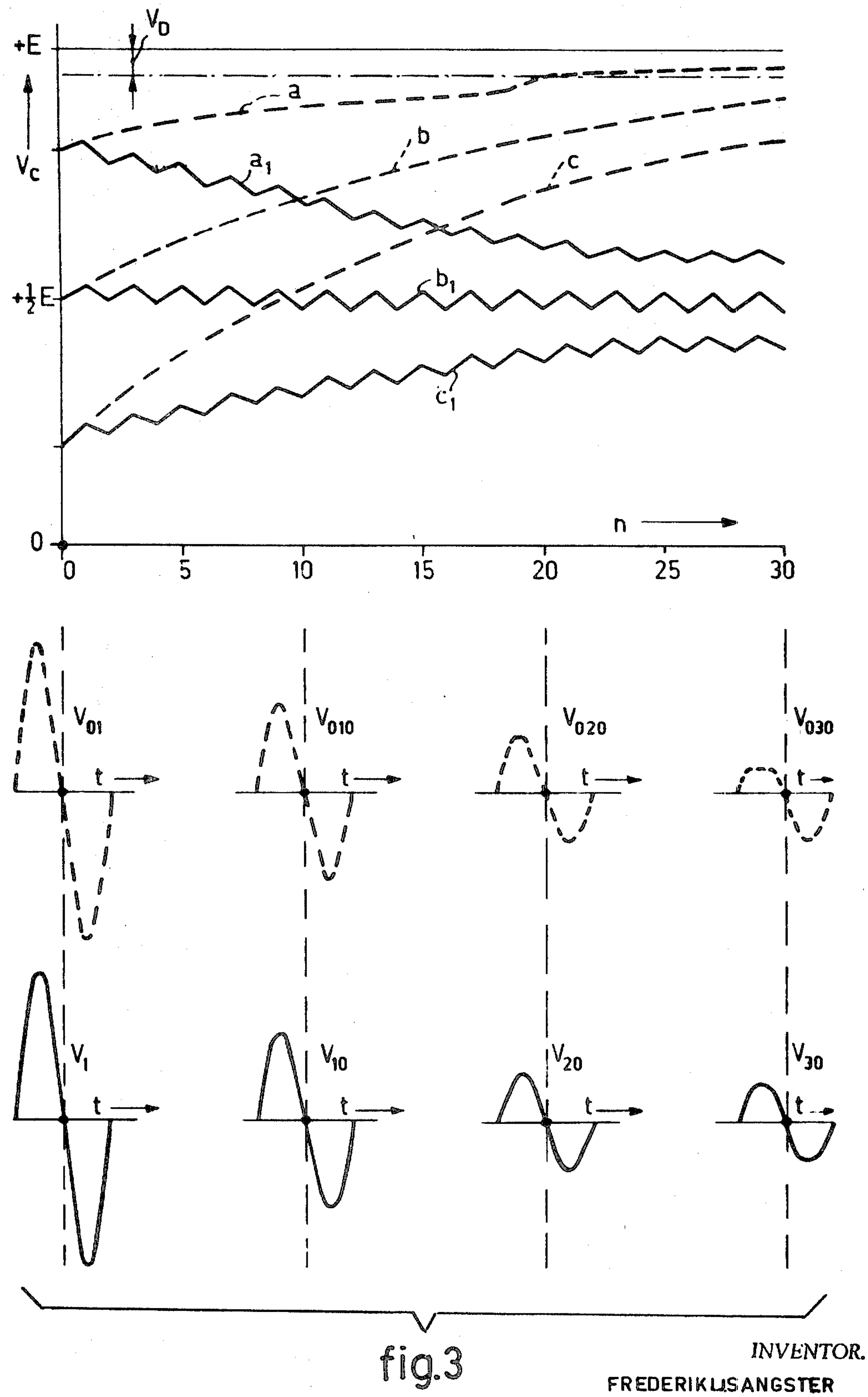

Features and advantages of the invention will appear from the following description of an embodiment thereof, given by way of example only, with reference to the accompanying drawings, in which FIG. 1 diagrammatically shows a capacitor store in accordance with the invention, FIG. 2 shows the voltage waveform at various points of the capacitor store, and FIG. 3 depicts the input signal attenuation produced in a capacitor store in accordance with the invention and also that produced in the known capacitor store.

Referring to FIG. 1, there is shown a sequence of capacitors comprising capacitors $C_1$ to $C_n$. These capacitors are interconnected by way of the main current paths of transistors $T_1$ to $T_n$, the capacitor terminals remote from these main current paths being connected to a point of constant potential. It should be noted that the term "main current path" is in the case of two-terminal transistors to be understood to mean the emitter-collector path and in the case of field-effect transistors the path between the source and the drain electrodes. The control electrodes of the odd-numbered transistors are interconnected so as to form a first junction point which is connected to an output 1 of a switching voltage source S. The control electrodes of the even-numbered transistors are also interconnected so as to form a second junction point which is connected to an output 3 of the switching voltage source S. The emitter of the transistor $T_1$, or its source when this transistor $T_1$ is a field-effect transistor, is connected to a point of constant potential through the series combination of a resistor $R_1$, a signal voltage source $V_i$ and a direct voltage source $E_1$. The terminals of the odd-numbered capacitors nearer the main current paths of the transistors $T_1$ to $T_n$ are connected to an output 2 of the switching voltage source S through odd-numbered diodes $D_1$, $D_3D_5$. The terminals of the even-numbered capacitors nearer the main current paths of the transistors $T_1$ to $T_n$ are connected to an output 4 of the switching voltage source S through even-numbered diodes $D_2$, $D_4$, $D_n$. The voltages which appear at the outputs 1, 2, 3 and 4 of the switching voltage source S are shown in FIGS. 2*e*, 2*d*, 2*a* and 2*b*, respectively. The operation of the capacitor store shown in FIG. 1 is as follows:

We shall assume that in a time interval $\tau_3$ the capacitor $C_1$ has received an information *e* (see FIG. 2*e*). In a time interval $\tau_5$ the transistor $T_2$ is switched into circuit so that the capacitor $C_1$ is charged until the voltage across this capacitor $C_1$ has become equal to 0 volts. Simultaneously the charge deficiency $C_1 (E-e)$ present in the capacitor $C_1$ during a time interval $\tau_4$ is transferred, attenuated by a factor $d$, to the capacitor $C_2$, neglecting the threshold voltage $V_d$ between the base and the emitter if $T_1$ is a two-terminal transistor or threshold voltage between the control electrode and the source if $T_1$ is a field-effect transistor. As a result the voltage across the capacitor $C_2$ falls to $E-d\cdot(E-e)$ volts, where $d$ is an attenuation factor for the said charge transfer which in the case of two-terminal transistors is mainly determined by the emitter collector current gain factor $\alpha$ of the transistors and in the case of field-effect transistors is mainly determined by leakage currents which occur in the capacitors. During a time interval $\tau_7$ the capacitor $C_2$ is further discharged by the transistor $T_3$, until the voltage across this capacitor has become equal to 0 volts. Simultaneously, the charge excess $C_2\{E-d\cdot(E-e)\}$ present in the capacitor $C_2$ during time intervals $\tau_5$ and $\tau_6$ is transferred, attenuated by a factor $d$, to the capacitor $C_3$. As a result the voltage across the capacitor $C_3$ becomes $[E-d\cdot\{E-d(E-e)\}]$ volts. During the time interval $\tau_3$ the capacitor $C_3$ is further discharged by the transistor $T_4$ until the voltage across this capacitor has become equal to 0 volts. Simultaneously the charge deficiency $C_3$th $[E-d\{E-d(E-e)\}]$ which was present in the capacitor $C_3$ during time intervals $\tau_7$ and $\tau_8$ is transferred, attenuated by a factor $d$, to the capacitor $C_4$. As a result, the voltage across the capacitor $C_4$ becomes $E-d[E-\{E-d(E-e)\}]$ volts. A simple calculation will show that after the transfer between the $(n-1)^{th}$ capacitor and the $n^{th}$ capacitor the voltage $V_n$ across this $n^{th}$ capacitor is equal to $\{E-(d-d^2+d^3-d^4\pm d^n)E\pm d^n e\}$ volts. For a large value of $n$ this approaches to $$V_n=E-d\cdot E/1+d\pm d^n\cdot \tfrac{1}{2}E\pm d^n\cdot e \qquad (1)$$ if $d$ is near unity.

FIG. 3 depicts the variation of the voltage $V_n$ as a function of the number $n$ both for the known capacitor store (broken lines) and for the capacitor store in accordance with the invention. A broken line $b$ shows the variation of the zero level as a function of the number $n$ in the known capacitor store, and the solid line $b$ shows the variation of the zero level as a function of the number $n$ in the capacitor store in accordance with the invention. A comparison of the variations of these zero levels shows that the zero level in the capacitor store in accordance with the invention converges towards the fixed value ½E volts. FIG. 3 also shows the variation of the extreme values of the input signals $V_1$ and $V_{01}$ applied to the capacitor store in accordance with the invention and to the known capacitor store, respectively, as a function of the number $n$ of the capacitors. The broken line curve $a$ shows the variation of the minimum of the in put signal $V_{01}$ and the broken line curve $c$ the variation of the maximum of the said input signal, both as a function of the number $n$. The solid line $a_1$ shows the variation of the minimum of the input signal $V_1$ as a function of the number $n$ and the solid curve $c_1$ shows the variation of the maximum of the input signal $V_1$ as a function of the number $n$. A closer inspection of the variation of the broken line curve $a$ shows that the transistor $T_{20}$ associated with the capacitor $C_{20}$ of the known capacitor store has entered its nonlinear operating range. As a result the input signal $V_{01}$ will be distorted, which is depicted by the curve $V_{020}$ in FIG. 3, which shows the variation of the voltage across the capacitor $C_{20}$ as a function of time. Furthermore the variation of the curve $a$ of FIG. 3 shows that the value $n$ at which distortion of an input signal sets in depends upon the value of the amplitude of the input signal. Hence the choice of the point in the known capacitor store at which a charge amplifier must be included is determined by the value of the input signal and also by the value of the number $n$. A closer inspection of the variation of the solid-line curve $a_1$ shows that none of the transistors of the capacitor store in accordance with the invention enters its nonlinear operating range. Consequently, the point at which the first charge amplifier is to be included in the capacitor store depends solely on the required signal-to-noise ratio. When not more than 200 stages are connected in series the charge amplifiers may generally even be dispensed with, the signals being amplified in a conventional manner after their passage through the integrated delay line.

Since in each odd-numbered capacitor of the capacitor store of FIG. 1 charge is supplied from both directions, an additional diode is required to conduct away a constant charge after each transfer. In FIG. 1, these additional diodes are the odd-numbered diodes $D_1$, $D_3$ and $D_5$. Similarly, each even-numbered capacitor requires an even-numbered diode to supply a constant charge after each transfer. Instead of the diode shown in FIG. 1 two multiemitter transistors may be used. In this case, the even-numbered diodes are replaced by the same number of base-emitter diodes of an NPN multiemitter transistor. The odd-numbered diodes then are replaced by an equal number of base-emitter diodes of a PNP multiemitter transistor. This use of multiemitter transistors provides the advantage that at the outputs 2 and 4 of the switching voltage source considerably less control energy is to be delivered so that less exacting requirements are to be satisfied by the wiring and by the output transistors of the switching voltage source which are coupled to the outputs 2 and 4, which is of special importance with sample frequencies higher than 1 mc./s.

Obviously the invention is not restricted to the embodiment given and to one skilled in the art many modifications are possible without departing from the scope of the invention. Thus, both two-terminal transistors and field-effect transistors may be used. Also, both field-effect transistors having $n$-type and $p$-type channel regions and field-effect transistors of the enrichment and depletion types may be used. Furthermore, the circuit arrangement shown in FIG. 1 may advantageously be used in a conventional design of a filter for electric signals. The circuit arrangement of FIG. 1 may also be combined with conventional input and output circuits. Further, two or more circuit arrangements of the kind shown in FIG. 1 may be connected in parallel so as to have at least one common input and/or at least one common output.

I claim:

1. A capacitor store, comprising a plurality of transistors of a first conduction type each having a control electrode and a main current path, a plurality of transistors of an opposite conductivity type each having a control electrode and a main current path, means for serially connecting the main conduction paths of the transistors of the first conductivity type to the main conduction paths of the transistors of the opposite conductivity type to form a serially connected plurality of transistors of alternate conductivity types joined at junction points along the main conduction paths thereof, a separate capacitor connected to each of the junction points along the main conduction paths of the transistors, means for interconnecting the control electrodes of the transistors of the first conductivity types to a first control junction, means for connecting the control electrodes of the transistors of the opposite conductivity types to a second control junction, means for applying a first control signal of a first polarity to the first control junction, and means for applying a control signal of opposite polarity to the second control junction intermediate the control signals applied to the first control junction.

2. A capacitor store as claimed in claim 1, wherein the terminals of the capacitors more remote from the main current paths of the transistors are connected to points of constant potential.

3. A capacitor store as claimed in claim 1, further comprising a plurality of diodes of a first conductivity type each having a terminal connected to the terminal of alternate odd-numbered capacitors at the point where each of the alternate capacitors joins the main current path of the transistors, a plurality of diodes of an opposite conductivity type each having a terminal connected to alternate even-numbered capacitors at the points where the even-numbered capacitors join the main current paths of the transistors, means for providing control signals of a first polarity to the odd capacitors through the diodes of the first conductivity type, and means for providing the even capacitors with control signals of a polarity opposite to that of the control signals provided for the odd capacitors and alternating therewith through the diodes of the opposite conductivity type.

PO-1050
(5/69)

UNITED STATES PATENT OFFICE
CERTIFICATE OF CORRECTION

Patent No. 3,603,808 Dated September 7, 1971

Inventor(s) FREDERIK LEONARD JOHAN SANGSTER

It is certified that error appears in the above-identified patent and that said Letters Patent are hereby corrected as shown below:

Col. 3, line 25, cancel "$C_3$th" and insert --$C_3$--.

Signed and sealed this 4th day of April 1972.

(SEAL)
Attest:

EDWARD M.FLETCHER,JR.
Attesting Officer

ROBERT GOTTSCHALK
Commissioner of Patents